(12) United States Patent
Sundararajan

(10) Patent No.: US 7,263,953 B2
(45) Date of Patent: Sep. 4, 2007

(54) AUTOMATIC PET TRAINER

(76) Inventor: Krishnamurthy Sundararajan, 1105 S. WestWood Ave., Addison, IL (US) 60101

( * ) Notice: Subject to any disclaimer, the term of this patent is extended or adjusted under 35 U.S.C. 154(b) by 0 days.

(21) Appl. No.: 11/384,697

(22) Filed: Mar. 20, 2006

(65) Prior Publication Data

US 2006/0219187 A1 Oct. 5, 2006

Related U.S. Application Data

(60) Provisional application No. 60/666,422, filed on Mar. 30, 2005.

(51) Int. Cl.
*A01K 15/02* (2006.01)
(52) U.S. Cl. ............... 119/719; 119/707; 119/712; 119/61.5; 119/496; 119/718
(58) Field of Classification Search ............ 119/61.53, 119/51.11, 51.13, 51.04, 51.14, 56.1, 905, 119/712
See application file for complete search history.

(56) References Cited

U.S. PATENT DOCUMENTS

| | | | | |
|---|---|---|---|---|
| 3,050,302 A | * | 8/1962 | Rassier | 472/105 |
| 3,897,061 A | * | 7/1975 | Grattan | 473/511 |
| 3,946,702 A | | 3/1976 | Mazzini | |
| 4,209,940 A | * | 7/1980 | Meyer et al. | 446/300 |
| 4,212,412 A | * | 7/1980 | Ikeda | 221/81 |
| 4,213,269 A | * | 7/1980 | Grogg, Sr. | 446/433 |
| 4,493,669 A | * | 1/1985 | Neuhierl | 446/103 |
| 4,781,642 A | * | 11/1988 | Stanzel | 446/38 |
| 4,807,664 A | * | 2/1989 | Wilson et al. | 137/624.11 |
| 4,995,374 A | | 2/1991 | Black | |
| 5,156,630 A | * | 10/1992 | Rappoport et al. | 623/47 |
| 5,213,089 A | * | 5/1993 | DeLuca | 124/29 |
| 5,299,809 A | * | 4/1994 | Evangelista et al. | 273/380 |
| 5,405,142 A | * | 4/1995 | Arad et al. | 273/118 R |
| 5,690,452 A | * | 11/1997 | Baublits | 408/204 |
| 5,749,324 A | * | 5/1998 | Moore | 119/719 |
| 5,813,366 A | * | 9/1998 | Mauldin, Jr. | 119/710 |
| 5,819,690 A | | 10/1998 | Brown | |
| 5,947,061 A | | 9/1999 | Markham et al. | |
| 6,273,027 B1 | * | 8/2001 | Watson et al. | 119/712 |
| 6,276,353 B1 | * | 8/2001 | Briggs et al. | 124/71 |
| 6,346,025 B1 | * | 2/2002 | Tachau et al. | 446/71 |
| 6,367,899 B1 | * | 4/2002 | Hwang et al. | 312/334.47 |
| 6,401,657 B1 | | 6/2002 | Krishnamurthy | |
| 6,557,496 B2 | | 5/2003 | Herrenbruck | |
| 6,688,258 B1 | | 2/2004 | Kolesar | |
| 6,694,916 B1 | * | 2/2004 | Rucker et al. | 119/51.01 |
| 6,733,356 B2 | * | 5/2004 | Lee | 446/63 |

(Continued)

*Primary Examiner*—Teri Pham Luu
*Assistant Examiner*—Valentina Xavier
(74) *Attorney, Agent, or Firm*—Cook, Alex, McFarron, Manzo, Cummings & Mehler, Ltd.

(57) ABSTRACT

This invention relates to an integrated automatic device for training and feeding a pet, which also functions as a play mate while the owner is absent or otherwise engaged. A toy holder, when actuated by an ejector, throws a toy placed therein to a predetermined distance. This toy holder is actuated by a spring connected to a spring tensioner and a rotating shaft activated by a motor programmed by microprocessors. Voice command issuer and proximity switches are provided to regulate the functioning of the device. The device is connectable to a pet feeder including a feeder capable of supplying feed for a predetermined period. The entire system is controllable by a remote control.

19 Claims, 6 Drawing Sheets

U.S. PATENT DOCUMENTS

| | | |
|---|---|---|
| 2003/0116099 A1* | 6/2003 | Kim et al. .................. 119/719 |
| 2004/0040519 A1* | 3/2004 | Rucker et al. .............. 119/707 |
| 2004/0118361 A1* | 6/2004 | Mugford ..................... 119/712 |
| 2004/0182326 A1 | 9/2004 | Polimeni, Jr. |
| 2005/0066905 A1 | 3/2005 | Morosin et al. |
| 2005/0224003 A1* | 10/2005 | Yin et al. ................... 119/61.5 |
| 2006/0030235 A1* | 2/2006 | Brumagin et al. .......... 446/175 |
| 2006/0054724 A1* | 3/2006 | Matlin et al. .............. 241/37.5 |
| 2006/0054725 A1* | 3/2006 | Matlin ....................... 241/37.5 |
| 2006/0112898 A1* | 6/2006 | Fjelstad et al. ............. 119/496 |

* cited by examiner

AUTOMATIC PET TRAINER

CROSS REFERENCE TO RELATED APPLICATION

This application is directed to claim the benefits of a U.S. Provisional Application No. 60/666,422 filed on Mar. 30, 2005.

FIELD OF THE INVENTION

The present invention is oriented towards the pet industry, particularly to a device for entertaining pets by way of game, play, feeding and tone generation particularly in the absence of the owner.

BACKGROUND OF THE INVENTION

The demand for pet care equipments is on the rise. Pet owners face persistent problems of caring for their pets and feeding and keeping them entertained while they are not at home. It is believed by observation that household pets, namely dogs, cats and other small animals get frustrated due to boredom especially in the absence of their masters. As a consequence, the pets chew on furniture, shoes etc. and destroy them. Pets also tend to be hyperactive when the owners return home. In some cases, pets do not want to eat due to this inactivity and expect the owners to feed them personally. The solution to this would be to keep the pets engaged during these times.

U.S. Pat. No. 4,995,374 discloses a device designed to throw tennis balls and have a pet fetch the ball to keep the pet entertained. The machine launches the tennis ball automatically once activated and the dog is trained to bring back the ball to the machine. The machine could launch the next ball automatically, upon receipt of the pervious ball, and the cycle continues. This device has to be manually activated, with or without a remote, and the owner of the pet needs to be present for the continuation of this play. Reinforcement for the dog to play with is machine can only be accomplished manually i.e. the master providing a treat with his hands or by petting the pet. Hence, there is no reinforcement for the pet to continue to play without the master. If the master is not present the pet is very likely to quit playing as there is no treats or petting available as a reward for the retrieval of the ball, by the pet.

U.S. Pat. No. 5,819,690 titled discloses a ball with a hollow interior and a functionally solid geometric form that is projected from the inner core to the outside provides for the dispensing of treats at random when the rolling toy is rolled. This random behavior of the ball will release the treat randomly depending on the shape and texture of the treat. The random nature of this behavior would let the pet roll the ball until all such treats have been dispensed and there by ending the play time.

U.S. Pat. No. 5,947,061 discloses a device that may be made of different shapes but provides for pets to access the interior and there by gain access to various treats within the device. The depth of the treat location within the toy and the access difficulty would determine the location of the quality of treats the pet would prefer. This would keep the pet occupied for duration of time to gain access to its favorite treat or force the animal to quit reaching for the harder access areas.

U.S. Pat. No. 6,401,657 discloses a motorized pet food feeder having a food storage bin with a top and a bottom, the bottom having an opening. A bowl with a back, front, and a bottom is provided which has a housing extending from the back of the bowl. A motor is mounted to the housing that has a rotating shaft, and an auger is mounted to the rotating shaft. The pet food feeder is adapted to be used with various timing and sensing devices that control the actuation of motor and the duration of actuation, thereby controlling the amount of food transported by the auger to the bowl.

U.S. Pat. No. 6,557,496 discloses a treat dispensing toy consisting of a gate like structure that can open and close and hence the treat is dispensed. The manipulation of the toy and or various gates to release the treats can also provide feedback by a sound generating device. This keeps the animals occupied to play with the toy and obtain the treat if they are smart and are trained to perform the sequence of actions to gain egress to the treat. If the toy is made of one gate it would be too easy and if it was made with multiple gates it would be hard to train the pet. However the level of difficulty is reduced once the pet is trained and then the sequence of accessing the treat is preprogrammed (automatic) and the treat is accessed by the pet in a short duration. With this the pet will loose its interest to continue to play after the said treat is dispensed.

U.S. Published Application No. 2004/0182326 discloses an apparatus for feeding solid/liquid food for the pet. U.S. Published Application No. 2005/0066905 describes an automated way for feeding pets from the rotating food bowl. A timing mechanism controls the rotation of the bowl and aids in feeding the pet easily. U.S. Pat. No. 3,946,702 also provides for a similar device with different mechanics. Although both devices address feeding the pets at different time both devices do not address the stress experienced by the pet when the owner is not present.

U.S. Pat. No. 6,688,258 discloses a treat dispensing pet toy and training device consisting of a container with pet food or treats for interactive play with the owner of the pet. This toy could dispense treat and the treat is visible to the pet, motivating the pet to play with the owner to gain access to the treat. This toy however cannot be used without the owner's presence to provide for the treat manually. Hence, this cannot be used when the pet owner is not present and does not server the purpose of keeping the pet occupied when the pet owner is not present.

U.S. Pat. No. 6,694,916 discloses a toy dispenser that dispenses toys at random or pre-programmed intervals. Dispensing of these toys can be accompanied by odor from an odor generator, vibration from a vibration generator, lights and or sound. This toy dispenser presumes that the pet would be content playing with different toys at different times and hence the pet is kept simulated during the absence of the owner.

Nevertheless, these devices do not overcome the underlying concept of training and entertaining the pet to keeping them engaged and unaware of the absence of their masters for long durations. These devices also do not address the boredom of repeated use of the said devices and they do not provide for continuous reinforcement for the pet to continue to play over a long period and hence the need for development of a new device.

SUMMARY OF THE INVENTION

This invention relates to an for training, exercising, entertaining and feeding pets. The device according to the present invention will keep the pet entertained/busy as long as the owner requires and will provide food/treat as an outcome of good response by the pet. This in turn reinforces the behavior of the pet and hence motivates the pet to play the game and also expectantly wait for the next game cycle (reward/treat) without the build up of stress. Such expectations will distract the pet from focusing on the absence of their masters. Dogs in particular may benefit more from this device due to their inherent need for performing an action in return for their food. This device also provides for some form of motion/exercise that is not predictable at the onset of every game.

The device of the present invention of a housing provided with a base, base cover and top cover. A toy holder for holding a toy such as ball soft toys, discs and the like is provided within this housing. A rotary ejector is connected to a spring and a spring tensioner which is tensioned by an electric motor is provided to eject the toy, such a soft plush figure/artificial mouse/ball etc) placed in the toy housing.

The device of present invention can also be connected to an autopetfeeder, multiple treat feeder/multiple food dispenser/treat dispensing/individual dispensers and may include other rewarding measures. The multiple treat feeder is capable of dispensing "N" number of treats each dispensing process being triggered individually by the auto playmate. This device can also be integrated as a single device comprising of an auto pet feeder, playmate and trainer.

DETAILED DESCRIPTION OF DRAWINGS

Figure 6:
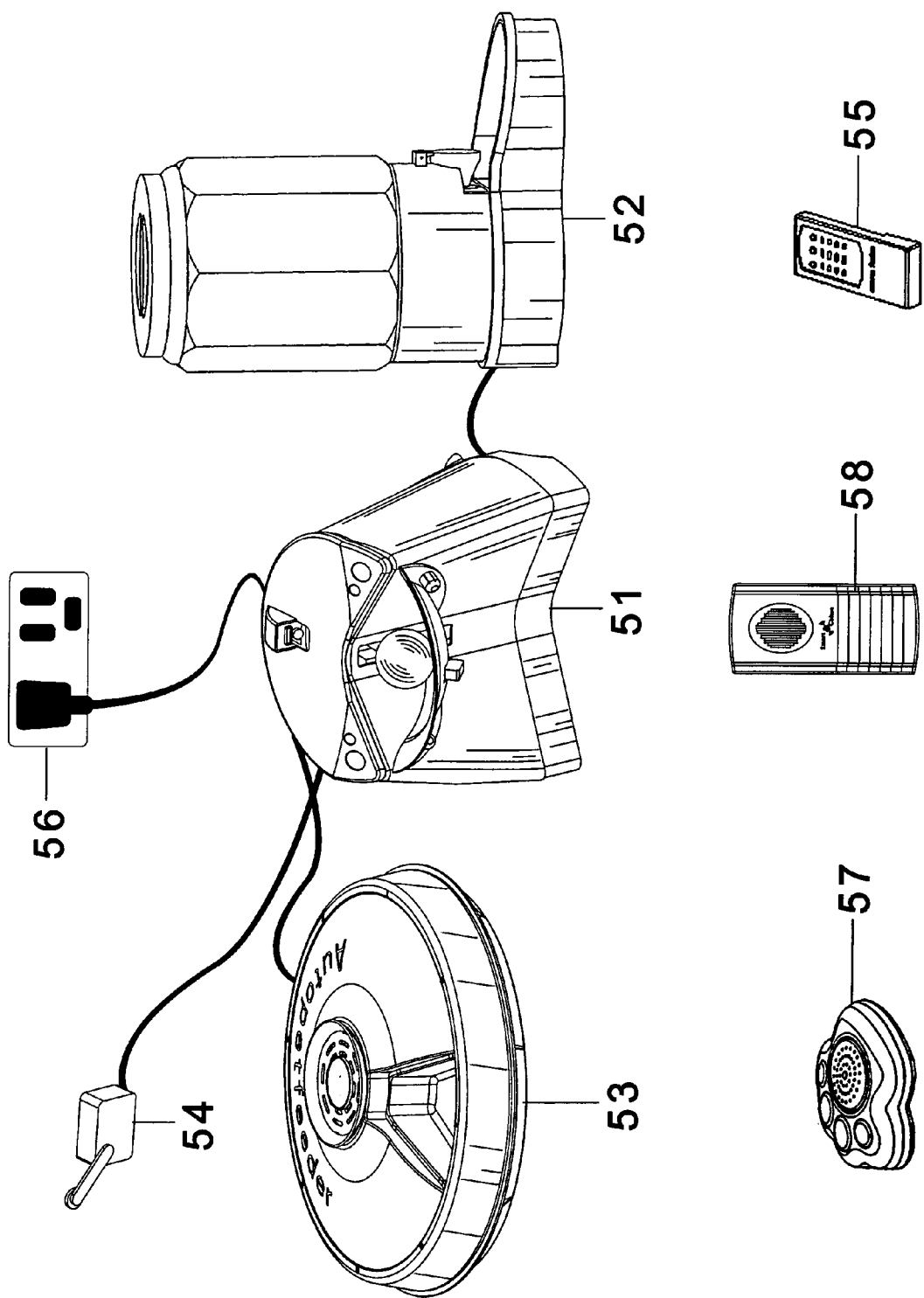
FIG. 6—Automatic pet trainer/playmate and the associated units (auto pet feeder, "N" day feeder, external (remote) signal device, remote control, remote signal device, remote bell and wall socket).

FIG. 6 provides a perspective view of the device according to this invention (i.e.) the automatic pet trainer/play mate 51 and the associated units namely automatic pet feeder 52, "N" day feeder 53, external signaling means 54, remote 55 wall socket 56, remote signal device 57 and remote bell 58.

The automatic pet feeder 52 may be of any type known in the prior art. The pet feeder is electrically connected with the automatic pet playmate. The pet feeder is provided with a container for food to be fed to the pets.

The automatic pet playmate 51 is plugged into a wall socket 56 for it to function. The device can also be battery powered or AC/DC converter. The remote 55 contains multiple switches e.g. one for clicker tone generation and the other for treat dispensing and another for programming and etc. This remote can either be enabled to throw the toy (ball) 10 FIG. 1 or ring the remote bell 58 depending on the pet and the game being initiated. The remote signaling device 57 allows for the pet to activate a signal with its paws to the auto playmate and then the game can continue. The external signal device 54 can be used for external signals to be provided to the system instead of the remote bell. This for e.g. could be a pet door being opened by the pet in response to the remote bell 58.

Figure 1:
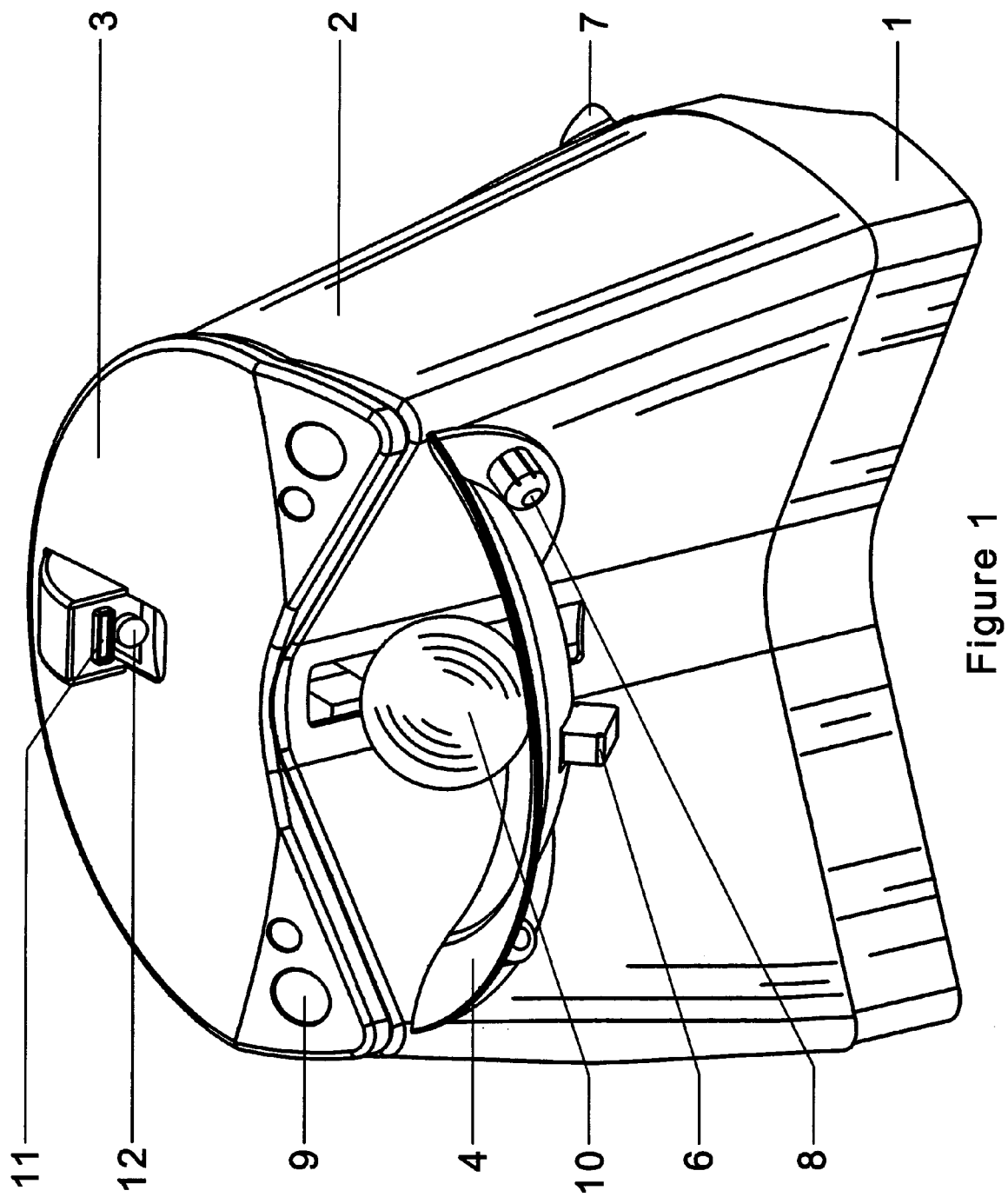
FIG. 1—Front view of the device.

As shown in FIG. 1, the automatic pet trainer is provided with base 1 which enables the unit to be firmly positioned on the desired surface/ground. A base cover 2, top cover 3 and electrical panel cover 7 are provided as a protective device restricting access to the internal parts of the device. The toy holder 4 retains the toy for ejection. It can be of any shape as desired in accordance with the shape of the toy 10. The mounting angle of this toy holder will determine the trajectory of the toy upon ejection from the said device. The toy 10 may be a ball, disc, soft toy or a bone. The toy holder screw 8 retains the toy holder with the base 1. A limit switch 6 is provided which detects the presence/absence of the toy 10 in the toy holder 4. The limit switch can also be replaced by a proximity sensor, capacitive sensor, magnetic sensor or a reed switch. A power ON/OFF switch 9 powers the system ON/OFF. A proximity sensor 11 is provided for detecting the presence of pets or human and to prevent the ejection of toy, in the event of detecting such proximity, during gaming as well as providing feedback to the system during pet training and gaming mode. An infrared (IR) sensor 12 is provided for detecting the location of the remote or receiving commands from the remote for the device to operate.

Figure 3:
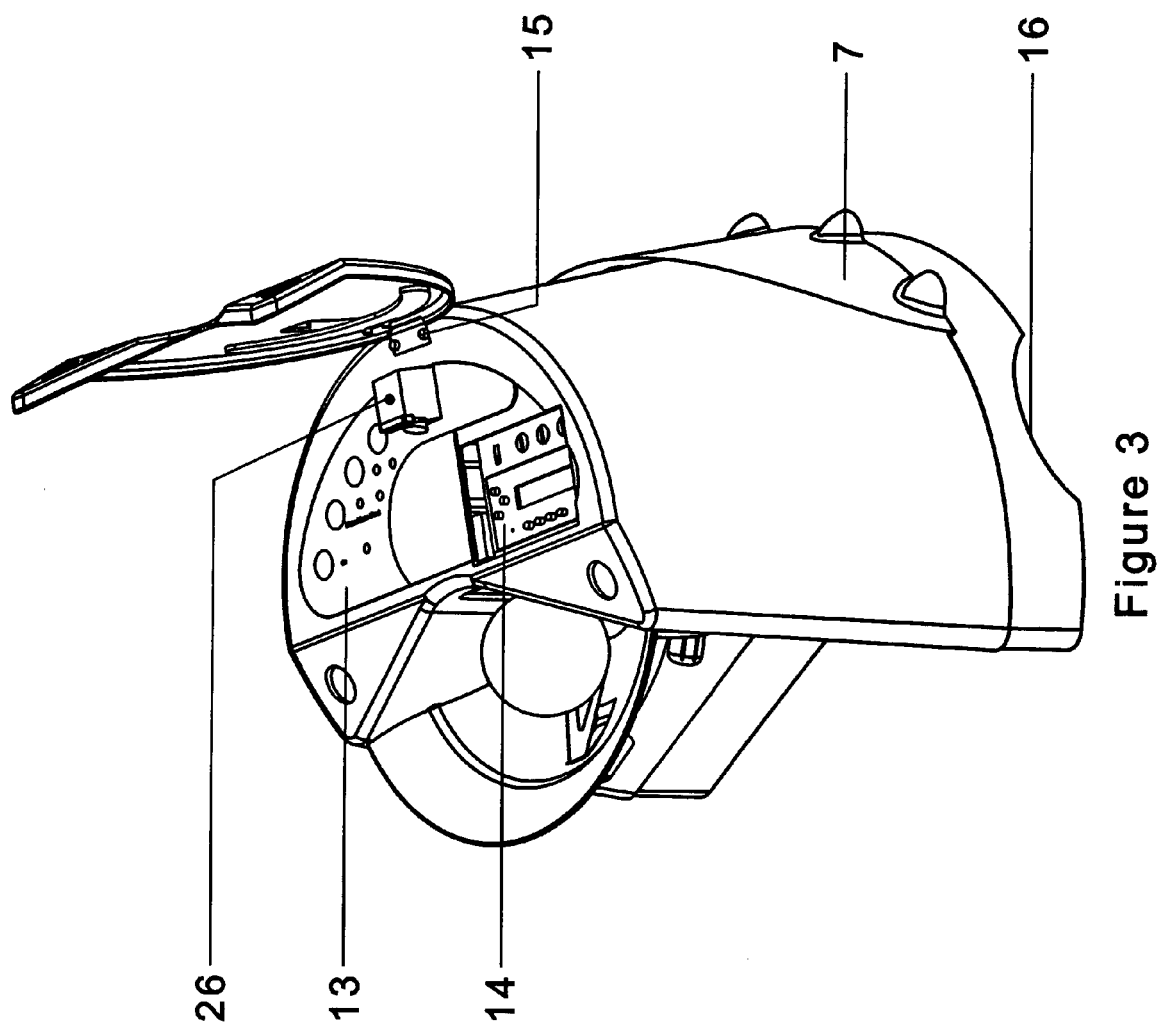
FIG. 3—Side view of the device.

As shown in FIG. 3 a microphone 26 is attached to the system for recording commands and identifying voices. The device is provided with a clicker 19 or a click sound generator, which is intended to draw the pets' attention. This clicker 19 may be any conventional mechanical or electronic device. The owners may record their voices in the voice recorder which is replayed by the speaker 30 at the time of training or when the pet is engaged by the auto playmate. The speaker 30 is covered by a speaker cover 5. The toy ejector 17 comprises a gear motor 18 for ejection/discharge of toy 10 from the toy holder 4. This motor may be replaced by a solenoid, clutch spring or electronic pulse width modulated motor, etc.

Figure 5:
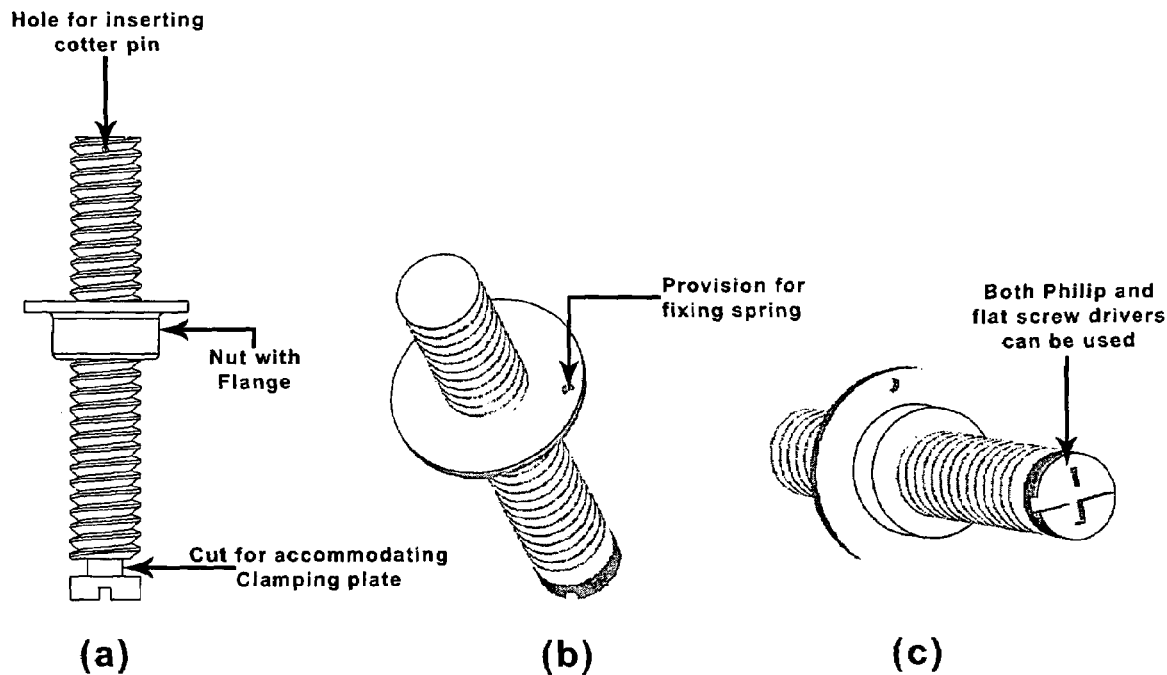
FIG. 5—Spring assembly for ejector.
Figure 5:
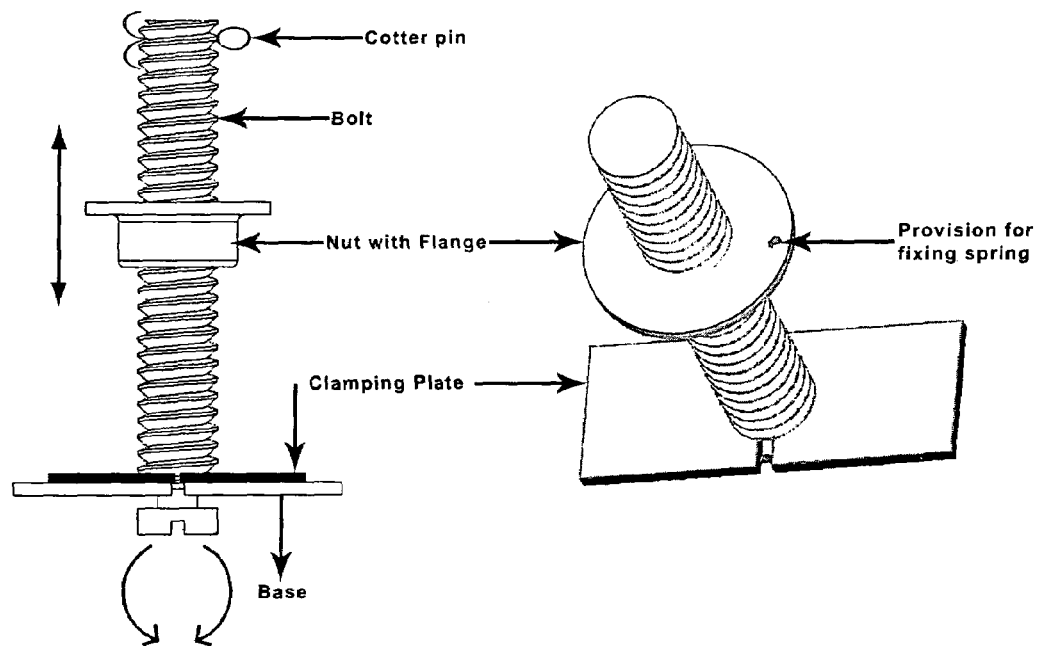

Spring 22 and spring tensioner 23 are provided for launching the toy from the toy holder. The spring tensioner 23 determines the velocity, acceleration, and the traveling distance of the toy. The shaft on which the spring is mounted can be rotated. The tension of the spring is adjustable with the help of a tension adjuster. A modified nut and bolt arrangement fixes the spring to the shaft see FIG. 5. The nut of this assembly has a flange provided with a slot, to which one end of the spring is fixed while the other end is connected to the ejector. The screw has a hole at the top which provides for a cotter pin to prevent the nut from coming out of the bolt. Other locking devices such as "C" clips, double nuts and or metal caps could be used to serve this purpose. A circular ring is cut at the other end of the bolt to enable its rotation and clamping to the play mate's base. The clamping plate has a radius cut, the radius of which is equal to or slightly smaller than the radius of the circular ring at the end of the bolt. The bolt also has a slot cut at one end to enable rotation of the bolt using a screw driver. This arrangement facilitates rotational motion of the bolt, controls the spring tension and the impact of the ejector on the toy holder. The toy travels a greater distance, if the tension of the spring is high and vice versa.

Figure 2:
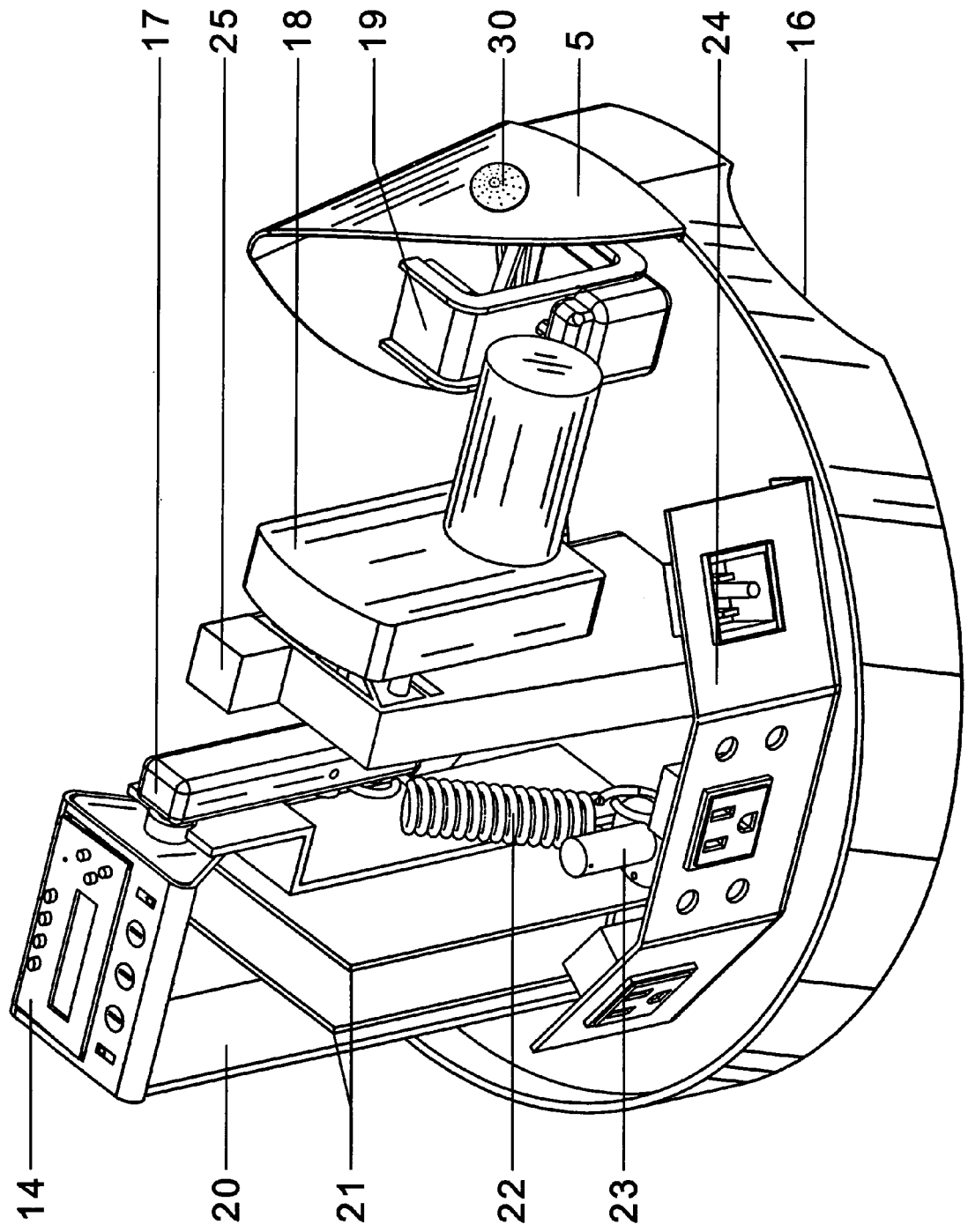
FIG. 2—Internal view of the device.
Figure 4:
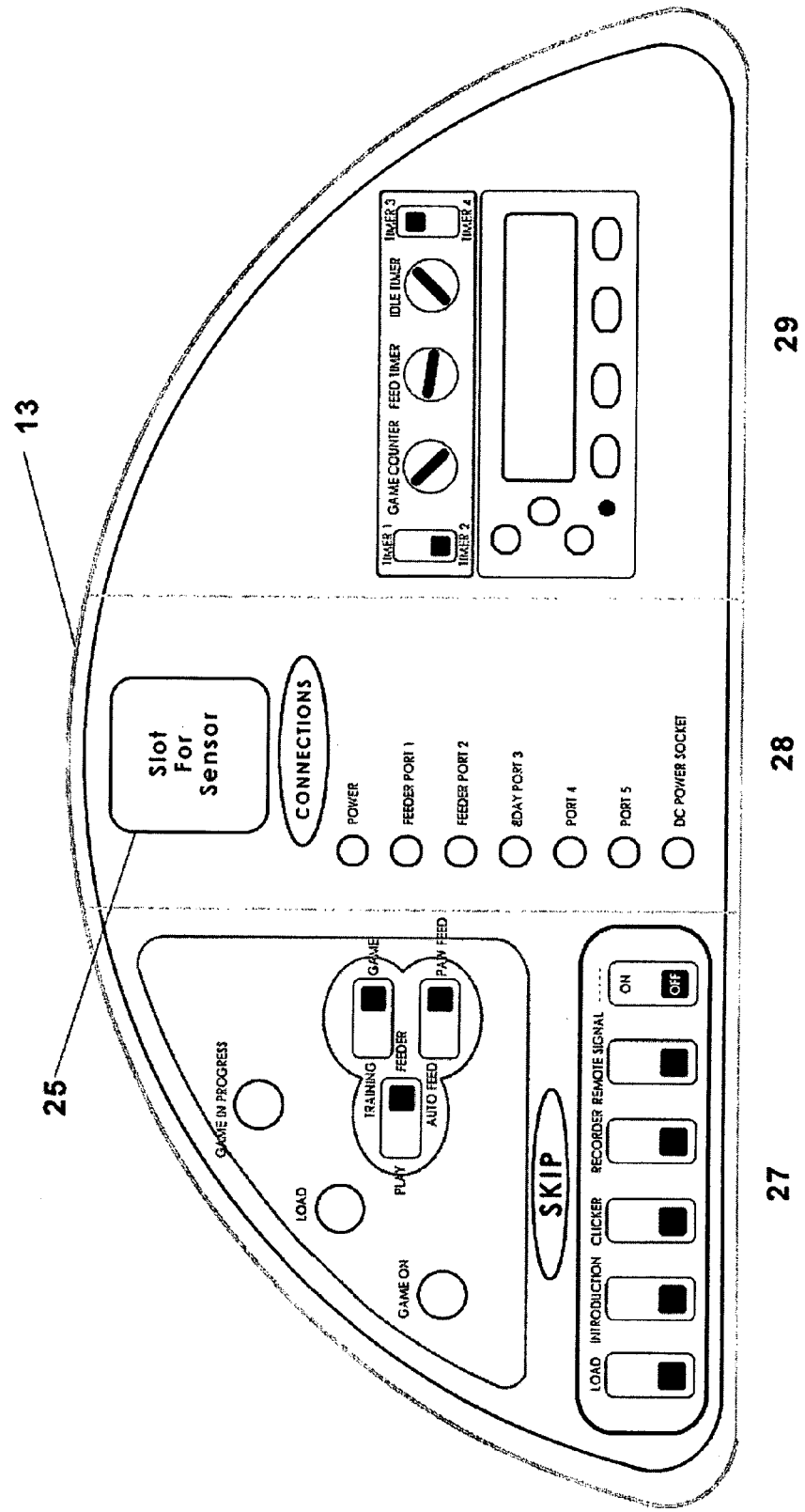
FIG. 4—Layout of control panel, status lights (LED) and timer unit.

As shown in FIG. 2, an electronic circuit board 21 is configured with the control panel 13 in FIG. 3 in FIG. 4. The control panel 13 further comprises a timer unit 14 (FIG. 3) and a voice recorder is provided for recording and replaying voice and click sounds during training. FIG. 4 also illustrates the layout of a typical control panel. The control panel is divided into three blocks based on its functionality, namely control switches 27, status 28 and timer unit 29. The power ON/OFF button 9 (FIG. 1) in the control panel powers the entire system. The control switches further comprise buttons for recording, loading, replaying and remote detection.

The status block 28 comprises input and output for power supply, known feeder, secondary feeder and socket for connecting the "N" day feeder (8 day feeder). The status block contains a slot/socket for the sensor 25.

The device can be used as a regular feeding means to feed the pet at predetermined period with predetermined quantities of food with the help of a timer 1. The timer 2 is also capable of activating and stopping game for the pet at predetermined intervals and is coordinated with timer 3 to determine the frequency of the game within the gaming period. Timer 4 enables repeating the game after one cycle/day or for multiple days is over.

Parts of the Unit
1. Toy 10—could be tennis ball, disc, soft toys, bones.
2. Base 1
3. Base cover 2
4. Top cover 3
5. Toy holder 4—retains the toy for ejection, which can be of various shapes if necessary to accommodate for different toy shapes.
6. Sensor or proximity sensor 11—detects the presence of pet or human.
7. Limit switch 6—detects the presence or absence of the toy.
7. Electrical panel cover 7—Provides connections to the external interfaces.
8. Toy holder screw 8—retains the toy holder.
9. Power on/off button 9—Powers the system ON/Off.
10. Infrared (IR) sensor 12—sends and receives commands to and from the remote.
11. Electronic circuit board 21—contains microprocessor for the system control and also the voice recording circuit.
12. Control panel 13—programming panel.
13. Clicker 19—a sound generation device use to draw the attention of the pets. This can be a mechanical or electronic device.
14. Speaker 30—emits voice recording that the user has recorded.
15. Speaker cover 5—covers the speaker from the elements.
16. Spring 22—used in ejector.
17. Spring tensioner 23—determines toy velocity, acceleration and throw distance.
18. Ejector 17—a rotary device that uses an electric motor and spring that will impact the toy thereby discharging/ejecting the toy out of the machine. The force of the spring is built up gradually upon rotation of the shaft and a certain moment in time all the energy is discharged to the imp actor/ejector in one shot. This trajectory of ejection is determined by location of the impact force and hence toys throw distance.
19. Handle 16—to carry the machine
20. Capacitive or retro-reflective sensor 25—alternative sensor for item 6.

Control Panel (FIG. 4)

Control panel is divided into three blocks, depending upon it function namely

1. Control switches 27.
2. Status LED 28.
3. Timer unit 29.

Inputs and Outputs (Status Block 28):

1. Power in for machine
2. Feeder port 1 for feeder
3. Feeder port 2 for secondary feeder
4. "N" day feeder socket 5. Port 4—Remote signal in 1
6. Port 5—Remote signal in 2

Timer Block (29)

1. Timer 1 for regular food feeding
2. Timer 2 for start of game
3. Timer 3 to set game frequency
4. Timer 4 for repeating number of game cycles/day The different units/functions of the system are integrated by the microprocessor on the circuit board 21 and are operable by remote controls.

BEST MODE OF OPERATION

Step One:

The first and foremost step is to train the pet to eat regularly from the AutopetFeeder or "N" day feeder or other feeding devices. The pet may take a few days to get accustomed to eat from such a feeder device.

Step Two:

A button on the remote is pressed to generate the sound on the clicker and to throw a ball (example tennis ball). The pet normally will fetch the ball. This training can be done either inside or outside the house by throwing the toy (ball) manually. Alternatively this training may be carried out inside the house with device according to the invention. Re-enforce this retrieval by providing a treat to the dog personally every time the pet obeys your command (i.e. fetching the ball). Gradually this training process can be effected by the integrated device and the remote is activated to provide the treat to the pet from the feeder. The pet may be trained to bring back the ball and drop it in the toy holder which action will be rewarded by a treat from the playmate. The playmate in turn provides treats to the pet using treat feeder. This re-enforces the pet's behavior. It can also be done manually or pre-programmed using the remote control. Alternatively, this device may then be set up in the training mode to provide a treat every time the pet comes near the machine. This is achieved with the help of a proximity sensor, which detects the presence of the pet near it. Your voice to the call the pet is also to be recorded (for e.g. COME HERE TOBY). The pet eventually gets trained to drop the toy in the playmate's toy holder by these methods.

Step Three:

After the pet is trained to drop the toy in the machine, the machine is set up to the game play mode to be carried out when the owner is present in the house. The start time, end time and the number of games to be played per hour are set up according to the preset program or a custom program which is entered into the microprocessor. The distance to which the ball is to be thrown can also be controlled and determined according to the layout of the house. The playing of the voice recording and the clicker sound generated by the machine will indicate game beginning. The activity of the pet during this session has to be continuously monitored.

Final Step:

Step 3 is continued but with a predetermined time period set, in the program, for retrieving the ball/toy. This means that if the pet does not retrieve the toy within a certain period the game is stopped. This step is activated after the pet is well trained. It is possible to include repeated beeps instead of discontinuing the game. This enables the pet to still get the treat but is continuously reminded to pick the ball and retrieve it. This will eventually train the pet to do the task faster.

The device can also be used to train pets to receive a reward when it responds to a command. The machine generates a tone on the remote bell for game play but does not eject the ball from its housing. Upon generation of a tone, the pet is trained to perform actions such as pressing the feedback switch on the remote signal device, which action will be rewarded by a treat. The advantage of the ball throw method is that the pet will have to retrieve the toy from a different location each time while the signals from remote signaling means originates from a fixed location. It is observed that the ball game makes play time more interesting to the pet. However, the remote signal device can serve other purposes, such as having it in a location where the pet likes to cuddle up or away from such a location and can be enabled for a better playing options for cats or other small pets. The remote bell could also be used to tell the pet that the toy throw game is going to begin as an advance warning device so that the pet may have ample time to come to the playmate from its cuddled up location.

The machine is programmable to use an external signal device to reward the pet. This can be used to make the pet do certain things that children would like to do or trainers would like for their pets to do, to re-enforcing specific behavior or behavior modification such as entering the house through the dog/cat door or in animal behavior research.

What is claimed is:

1. An integrated automatic device for training, entertaining and feeding pets comprising:
   a) a housing provided with a toy holder;
   b) a rotating ejector actuated by a tensioned spring connected to the toy holder to throw a ball a predetermined distance;
   c) a screw to adjust the spring tension in the ejector;
   d) a switch to detect the presence/absence of the toy in the toy holder;
   e) a proximity sensor to detect the presence/absence of a pet or human;
   f) a sound generating means;
   g) a voice recorder and microphone;
   h) a control panel for controlling the operations of said device;
   i) multiple timers with display means; and
   j) a power panel for various inputs and outputs.

2. The integrated automatic device of claim 1 wherein said housing has a base for holding the components of said device.

3. The integrated automatic device of claim 2 wherein the housing comprises a base cover, a top cover, an electrical panel cover, a top cover clamp, a handle and a toy holder.

4. The integrated automatic device as claimed in claim 1, wherein said rotating ejector comprising of a gear motor, a solenoid, clutch spring or electronic pulse width modulated motor for ejection/discharge of the toy from the toy holder.

5. The integrated automatic device of claim 4, wherein said ejector comprises an actable spring means and spring tensioner connected to a rotating shaft by means of an adjustable clamp.

6. The integrated automatic device of claim 1, wherein said screw is adjustable to control the ball throw distance.

7. The integrated automatic device of claim 1, wherein said switch is a limit switch, proximity sensor, capacitive sensor, magnetic sensor or a reed switch.

8. The integrated automatic device as claimed in claim 1, wherein said sound generation means is a clicker.

9. The integrated automatic device of claim 8, wherein said clicker generates sound based on the signal received from said switch.

10. The integrated automatic device claim 9, wherein said clicker is either a mechanical or electronic device.

11. The integrated automatic device of claim 1, wherein voice recording is facilitated by the voice recorder and microphone.

12. The integrated automatic device of claim 1, wherein the proximity sensor detects the presence of pet or human to facilitate ejection of the toy during gaming.

13. The integrated automatic device of claim 1, wherein said control panel is divided into three blocks, one each for control switches, status LED and timer.

14. The integrated automatic device of claim 13, wherein said control switches comprises a power ON/OFF button, input/output ports for connecting a feeder device, secondary feeder, "N" day feeder, remote signal access and power socket.

15. The integrated automatic device of claim 1, wherein the device is operated by a battery or an AC/DC power source.

16. The integrated automatic device of claim 13, wherein said timer is programmed for regular food feeding, start of game and setting game frequency and repeating of the game during a given day or days.

17. The integrated automatic device of claim 16, wherein a display unit is provided to view the time set by a timer setting means for said multiple timers.

18. The integrated automatic device of claim 1, wherein a microprocessor is programmed to control the functioning of said multiple timers and said control panel.

19. The integrated automatic device of claim 18, wherein a remote is provided to control the microprocessor and its program.

* * * * *